UNITED STATES PATENT OFFICE.

LEO ORNSTEIN, OF BROOKLYN, NEW YORK.

PAINT AND VARNISH REMOVER.

No. 931,335.　　　　Specification of Letters Patent.　　　Patented Aug. 17, 1909.

Application filed June 2, 1908. Serial No. 436,253.

*To all whom it may concern:*

Be it known that I, LEO ORNSTEIN, a citizen of the United States, residing at Brooklyn, in the county of Kings and State of New York, have invented certain new and useful Improvements in Paint and Varnish Removers; and I do hereby declare the following to be a full, clear, and exact description of the invention, such as will enable others skilled in the art to which it appertains to make and use the same.

This invention relates to that class of paint and varnish removers in which ether, alcohol, acetone, benzol, carbon bisulfid or a similar solvent are employed but I have discovered that by the addition of certain ingredients not hitherto employed in paint and varnish removers that the work of removing paint and varnish is materially assisted in an economical manner.

The composition I have found most efficacious in removing paint and varnish is a mixture of ether, alcohol and anilin oil. This mixture will work satisfactorily in various proportions but I have found the following composition of especial efficacy. I take of ether 10% by volume, of alcohol, either methyl or ethyl, 55% by volume and of anilin oil 35% by volume. Pure anilin chemically known as $C_6H_5NH_2$ may be employed in the manufacture of my paint remover but commercial anilin oil containing some toluidin as an impurity will be found equally efficacious. In fact toluidin acts similarly to anilin when mixed with ether and alcohol or other solvents for use as a paint remover and toluidin may be substituted for anilin where commerical reasons make this desirable.

A composition made according to the above formula is efficacious as a paint remover very largely on account of the anilin contained therein. Ether, alcohol, bisulfid of carbon, light tar oils and other volatile solvents while having a solvent action on paints and varnishes may not be used alone on account of their volatility and I have found the combination of anilin with one or more of these to be efficient for the reason that anilin is not volatile, combines readily with other solvents, prevents by its presence the too rapid vaporization of other solvents and has itself a distinct solvent action on paint and varnish compositions.

In some cases it will be found desirable to use a thickener for my paint and varnish remover where the action of the solvents is slower on account of the thickness, hardness or age of the paint or varnish coating. For the purpose of thickening my paint remover I employ a small amount of wool fat or a particular variety of wool fat commercially known as lanolin which is readily miscible or soluble in the other ingredients of my paint remover and which I have found efficient as a retarding agent.

In practice I have found the following composition suitable for use as a paint and varnish remover: ether 10%, alcohol 55%, wool fat 5% and anilin 30%, all the ingredients being stated by volume.

What I claim is:

1. In a paint and varnish remover, the combination of ether, alcohol, anilin, and a retarding agent.

2. In a paint and varnish remover, the combination of anilin, ether, alcohol and wool fat.

3. In a paint and varnish remover, the combination of anilin, ethyl alcohol, ether and wool fat.

4. In a paint and varnish remover, the combination of anilin, alcohol, ether and lanolin.

5. In a paint and varnish remover, the combination of anilin, ether, ethyl alcohol and lanolin.

6. In a paint and varnish remover, the combination of ether 10%, alcohol 55%, wool fat 5% and anilin 30%, all the ingredients being stated by volume.

7. In a paint and varnish remover, the combination of ether, alcohol, anilin and toluidin.

In testimony whereof I affix my signature in presence of two witnesses.

LEO ORNSTEIN.

Witnesses:
　　NELLIE LOVE,
　　HUGO MOCK.